3,369,932
COATING WITH MIXTURES OF WAX AND
ETHYLENE COPOLYMER EMULSIONS
Webster M. Sawyer, Jr., Orinda, and Warren C. Simpson,
Berkeley, Calif., assignors to Shell Oil Company, New
York, N.Y., a corporation of Delaware
No Drawing. Filed July 16, 1964, Ser. No. 383,221
4 Claims. (Cl. 117—161)

ABSTRACT OF THE DISCLOSURE

Wax-polymer films are applied to substrates by (1) mixing aqueous emulsions of wax and ethylene —$C_{3-8}$ copolymer, (2) applying the mixed emulsions to the substrate, (3) drying to form a wax-polymer film, (4) heating the film to above the wax melting point and (5) cooling the film. Useful substrates are paper and carton boards especially for use in wrapping and containing dairy products and other food products.

---

This invention relates to the application of essentially water-impermeable coatings to various substrates by means of wax and polymer-containing emulsions.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene in particular. In addition, polymeric wax reinforcing agents such as copolymers of ethylene and vinyl acetate in concentrations on the order of 20 to 30%, basis wax, have also been used to some extent in attempting to overcome the inadequacies of conventional petroleum waxes. Furthermore, copolymers of ethylene with $C_{3-8}$ olefins have been found to have quite excellent wax-reinforcing properties.

However, the use of wax reinforced with polymers or copolymers, as well as the use of neat polymers, has not been completely satisfactory because of the viscosity characteristics of such materials. More specifically, it has been found that most polymer-reinforced waxes or neat polymers, suitable for coatings, have considerably higher melting points than the waxes which they were intended to replace. This means, of course, the higher temperatures must be employed to obtain proper viscosity for their use in conventional coating equipment. The disadvantageous high viscosity in polymer wax melts is a consequence of the high molecular weight of the polymers which is required to maintain satisfactory coating properties. For example, in a wax-polymer mixture containing 30% polymer, the following effects were observed by varying the inherent viscosity of the polymer:

| Inherent viscosity of polymer | Tensile strength, p.s.i. | Percent elongation |
|---|---|---|
| 1.8 | 350 | <50 |
| 2.6 | 2,500 | 700 |

The data illustrate that the disadvantage of high viscosity in wax-polymer melts cannot be alleviated merely by reducing the molecular weight of the polymer without serious degradation of tensile strength and extensibility. Furthermore, in many instances, it is found that substitutes of the type under consideration here have high Melt Indices. As used here the term "melt index" refers to a measure of the extrusion rate of the material through a given orifice under specified temperature and constant load (shear rate) conditions. (Refer to ASTM procedure 1238–57.) The significance of this is that comparatively small variations in temperature of such molten polymer or wax/polymer mixtures result in great variations in viscosity and flow characteristics, which in turn upset the delicate balance of operating variables so necessary to the successful coating of substrates on a commercial scale. Thus the coating of materials with polymer-containing coatings almost invariably involves higher heating costs and modification of the coating equipment to facilitate its use at higher melt temperatures. Furthermore, more precise means of controlling the temperature in both the melt and application stage of the coating operations may also be required, which contributes to the still higher cost of coating equipment for such materials. Still further, the prolonged exposure to high temperatures may lead to undesirable thermal decomposition. Thus, if a stable emulsion of a particular coating material can be produced, the necessity for heating to high temperatures and the problems attendant thereto would be virtually eliminated.

It has now been discovered that wax-polymer coatings can be deposited on surfaces from low-viscosity emulsions which are free of the aforementioned limitations of viscous polymer-wax melts and which require much simpler equipment than is required for film extrusion. More particularly, it has been found that wax-polymer films having improved properties may be applied to substrates by (1) mixing an aqueous wax emulsion with an aqueous polymer emulsion, (2) applying the mixed emulsions (emulsion mixture) to the substrate, (3) removing essentially all the water from the applied emulsion mixture to form a wax-polymer film, (4) heating the thus-formed film to obtain a high degree of particle coalescence, and (5) cooling the film.

The polymeric materials which are used in the invention consist of certain polymers having the general linear configuration

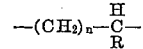

wherein $n$ is an average integer between about 10 and about 50 (preferably 10–40), R is a hydrocarbyl radical having 1–6 carbon atoms and the unit $(CH_2)_n$ is an unbranched hydrocarbon chain, the average molecular weight of the copolymers being up to about 5 million, usually between about 20,000 and 800,000 (preferably 200,000–400,000). Expressed as intrinsic viscosity, copolymer intrinsic viscosities of between about 1.0 and 6.0 enhance the physical properties of petroleum waxes, providing wax compositions with unexpectedly improved toughness, flexibility, tensile strength, elongation, resistance to cracking at low temperatures, and other desirable properties. Copolymers containing as low as 60 moles of ethylene per 100 moles of alkene can be employed in the emulsions of the invention. However, the polymers are preferably copolymers of 80–95 moles of ethylene with 20–5 moles of a $C_{3-18}$ alpha-alkene and the intrinsic viscosity of the copolymer is between about 2 and 5. Still more preferably, the copolymers are those formed between 85–93% of ethylene and 15–7% of a $C_{3-8}$ alpha-olefin.

The polymers utilized in the compositions of this invention are preferably prepared by copolymerizing a mixture of ethylene and a higher alpha-alkene, preferably having from 3–8 carbon atoms per molecule but which may have as many as 18 carbon atoms per molecule. The most effective alpha-olefins for this purpose are propylene and butene-1, although higher alkenes such as octene-1 or octadecene-1 may be utilized in place of or in addition to the lower alpha-olefins.

While the process of forming the copolymers does not form a part of the present invention, the copolymers may be prepared by well known procedures, such as catalytic polymerization. The proportion of catalyst should be in the order of 0.01–1%, the polymerization being carried out in an inert solvent such as an alkane (cyclohexane). Polymerization in this manner is normally conducted under low pressures in the order of 1–30 p.s.i.g. and temperatures of 0–100° C. for a time of 1–5 hours.

Catalytic systems which may be used include combinations of aluminum alkyl chlorides such as aluminum diethyl monochloride with trialkyl vanadates, exemplified by triisobutyl vanadate, or "ethyl aluminum sesquichloride" $(Al)_2(C_2H_5)_3Cl_3$. Other vanadates include tri-secondary butyl vanadate or mixed isopropyl secondary butyl vanadates.

Polymers having the general formula

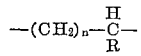

may be prepared by other means, such as copolymerization of unsubstituted diolefins, such as butadiene, with alkyl-substituted diolefins, such as isoprene, and hydrogenation of the copolymer to eliminate any remaining unsaturated linkages. Hydrocarbyls other than alkyls are obtained by the use of styrene or alkylated styrenes in place of $C_{3-20}$ aliphatic olefins.

The density of the copolymers may be varied over a considerable range, usually between about 0.85 to about 1.0, low-density copolymers being regarded as those having densities in the order of 0.85 to about 0.91 and high-density materials being regarded as those having densities from the latter upper limit to about 1.0. Advantages are gained by the combination of several different degrees of high and low density and/or high and low molecular weight copolymers. For example, increase in low-temperature properties is obtained without a corresponding increase in brittleness being experienced.

The precise mol ratio of ethylene to higher alkene will depend in a large part upon the exact type of wax being modified with the copolymer. It appears to be necessary or at least highly desirable to coordinate the unbranched chain length of the individual wax molecules with the unbranched chain length of the polymer employed. The degree of branching in the copolymer is established by the mol ratio of ethylene to higher alkene. Since petroleum waxes contain a spectrum of wax species, it is desirable to have a limited spectrum of unbranched chain units in the copolymer to coordinate with the several wax species present in the normal petroleum wax. An example of such a wax spectrum is to be found in the figures of Arabian patent, U.S. 2,915,447, and in Table II of said patent. Therein it will be seen that a paraffin wax having an average melting point of 123° F. contains about 86 mol percent of normal paraffins having from 22 to 27 carbon atoms per molecule. On the other hand, a paraffin wax having an average melting point of about 139° F. contains about 72 mol percent of waxes having from 26 to 31 carbon atoms per molecule.

The waxes which may be used in the invention are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between about 120° F. and about 165° F., preferably between about 125 and 145° F. Microcrystalline waxes which contain only minor amounts of normal paraffins and largely predominate in highly branched and naphthenic waves have melting points in the order of 130–160° F., usually between 140 and 150° F.

The higher melting point paraffin waxes are especially useful in many coating wax composition: heavy distillate waxes obtained from the highest boiling distillate lubricating oil fractions by dewaxing have melting points in the order of 140 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are especially subject to being fortified with respect to blocking and tensile strength as well as toughness by incorporation with the subject copolymers.

It is normal experience in designing wax coating compositions to find it necessary to combine several waxes together in a single composition. The purpose of this, of course, is to obtain the beneficial properties inherent in each particular type of wax or to minimize adverse properties of other waxes so included.

In order for the coatings which are prepared from the emulsion of this invention to have maximum toughness and extreme flexibility as well as other corresponding properties, various proportions of any of the wax components may be replaced with copolymer, preferably a copolymer having an average molecular weight about 50–500 times the average molecular weight of the wax composition. Suitable compound waxes of this category may have the following composition:

| | Percent wt. |
|---|---|
| Paraffins wax, 122–142° F. melting point | 40–60 |
| Heavy distillate wax, 142–185° F. melting point | 5–10 |
| Microcrystalline wax, 130–160° F. melting point | 5–15 |
| Plastic wax | 0–20 |
| High melting paraffinic wax, 180+° F. melting point | 0–70 |
| Copolymer | 5–50 |

The wax emulsion of the invention were prepared from a high-melting point (HMP) residual wax using various fatty acid/amine combinations as the emulsion stabilizer (surfactant). It will, however, be recognized that other well known and widely used surfactants may be used as well. Examples of other suitable surfactants are polyoxypropylene stearate, sorbitan monolaurate, hexaethylene glycol monostearate, polyoxyethylene monoleate, polyoxyethylene allyl phenol, polyoxyethylene sorbitan monolaurate, potassium oleate, sodium lauryl sulfate, N-cetyl N-ethyl morpholinium ethosulfate, stearyl diethylethanol amine, sodium stearate, and oleyl triethanol amine.

The wax emulsions were prepared by adding the acid and amine to the wax at 70–90° C. in a heated vessel and then adding boiling water to the wax while stirring. In this procedure, the wax-continuous system becomes increasingly viscous as water is added and then rapidly inverts to a fluid, water-continuous emulsion. After addition of the desired amount of water, the emulsion is cooled slowly and homogenized.

The polymer emulsions were prepared by emulsification of a heated solution containing 15% by weight polymer in a volatile hydrocarbon solvent with water, using potassium rosin acid soap as the stabilizer. This dilute emulsion is then stripped of solvent under reduced pressure to give a dilute latex containing 5–12% polymer. The dilute latex is then concentrated by creaming or by centrifugal means to a desired polymer content which may in some cases be as high as 60–65% weight.

The invention will better be understood by reference to the following examples.

EXAMPLE I

Latex containing copolymer was blended with wax emulsion in desired proportions and mixed. The mixture of emulsions was poured carefully on a level Pyrex plate and spread with a doctor knife set at 0.028–0.040 inch. The films were covered with a ventilated box and allowed to dry overnight at room temperature, after which they were removed from the plate. Some of the films, as indicated below, were heat-treated at 70° C. either by sandwiching them between aluminum foil and applying heat to the foil or in some cases by heating the Pyrex plate before removal of the film. The films, cut into standard microdumbbells, were then tested as to tensile strength on an Instron testing machine at a crosshead speed of 2 inches per minute. (In some cases elongations were also determined from the amount of crosshead travel and original gauge length.) The results were as follows:

TABLE I.—PROPERTIES OF FILMS CAST FROM MIXTURES OF COPOLYMER LATEX AND WAX EMULSION

Latex:
 Solids: 64.8% wt.
 Copolymer: Ethylene/propylene copolymer, 4.4 I.V., 65.5 mole percent $C_2^=$
 Emulsifier: Potassium salt of rosin acids
Emulsion:
 Solids: 22.8% wt.
 Wax: 141–143° F. M.P. paraffinic distillate wax
 Emulsifier: Morpholine-stearic acid

| Test No. | Percent wt. Solids in Mixture | Percent wt. Copolymer in Solids | Length of Heat Treatment (hours) | Average Tensile Strength (p.s.i.) |
|---|---|---|---|---|
| 1 | 22.8 | 0 | None | 330 |
| 2 | 26.3 | 19.8 | None | 214 |
|   |      |      | 1    | 424 |
| 3 | 27.2 | 25.0 | None | 181 |
|   |      |      | 1    | 320 |
| 4 | 28.0 | 29.4 | None | 173 |
|   |      |      | 1½   | 274 |
|   |      |      | None | 143 |
| 5 | 29.5 | 35.0 | 1    | 218 |
|   |      |      | 4    | 236 |
| 6 | 53.8 | 50.0 | None | 73 |
|   |      |      | 1    | 105 |
| 7 | 50   | 100.0 | None | 86 |
|   |      |      | 1    | 88 |
| 8 | 32.5 | 100.0 | None | 88 |

The above data show that considerable increase in tensile strength results from heat-treating the film. During the foregoing test it was observed that elongations of the unheated films was 50–100%. It is therefore apparent that the forces imposed on the latex and wax particles during drying at room temperature do result in some degree of intimate mixture of the components. However, from the higher tensile strengths of the heated films, it is apparent that annealing above the melting point of the wax results in significantly further dispersal of the wax and copolymer, which may result in a cocrystallization of the components upon cooling.

EXAMPLE II

The procedure of Example I was repeated except that a high-melting point (183° F.) residual paraffinic wax was substituted for the lower melting distillate paraffinic wax.

TABLE II.—PROPERTIES OF FILMS CAST FROM MIXTURES OF COPOLYMER LATEX AND WAX EMULSION

Latex:
 Solids: 64.8% wt.
 Copolymer: Ethylene/propylene copolymer, 4.4 I.V., 65.5 mole percent $C_2^=$
 Emulsifier: Potassium salt of rosin acids.
Emulsion:
 Solids: 17.1% wt.
 Wax: 183° F. M.P. paraffinic residual wax.
 Emulsifier: Morpholine-stearic acid.

| Test No. | Percent wt. Solids in Mixture | Percent wt. Copolymer in Solids | Length of Heat Treatment (hours)[1] | Average Tensile Strength (p.s.i.) | Elongation at Break (percent) |
|---|---|---|---|---|---|
| 9  | 33.4 | 37.0 | ½ | 260 | --- |
| 10 | 24.3 | 67.9 | None | 74 | <10 |
|    |      |      | ½    | 315 | 90 |
| 11 | 25.8 | 45.8 | None | 102 | 20 |
|    |      |      | 1/12 | 199 | 70 |
|    |      |      | ½    | 208 | 70 |
| 12 | 30.9 | 60.8 | None | 95  | 35 |
|    |      |      | 1/12 | 165 | 80 |
|    |      |      | ½    | 144 | 90 |
| 13 | 35.6 | 71.0 | None | 68  | 50 |
|    |      |      | 1/12 | 114 | 105 |
|    |      |      | ½    | 111 | 160 |
| 14 | [2] 26.0 | 100 | 1 | 88 | --- |

[1] 90° C.
[2] Wax emulsion made with morpholine-oleic acid.

The data show that the use of the high-melting residual paraffinic wax gave unheated films which were quite brittle. However, heating the films above the melting point of the wax resulted in considerable increase in tensile strength.

The foregoing data indicate that while the heat-treating step is essential to obtain particle coalescence and thus improved mechanical properties of the film, the length of the heat treatment is not especially critical. The most important factor seems to be to heat the film above the melting point of the wax. The maximum temperature to which the film should be heated to obtain particle coalescence is governed by the temperature at which thermal decomposition occurs, though in the case of unconfined films, it will be preferred to keep the heat-treating temperature below the temperature at which the film will flow.

The copolymer used in each of the foregoing examples was an ethylene-propylene copolymer containing 65.5 mole percent of ethylene. Such copolymers are rubbery in nature. As will be seen in the following example, less elastomeric, more highly crystalline copolymers are considerably more effective when used in accordance with the invention.

EXAMPLE III

The same general procedures of Examples I and II were repeated again, using a high-melting-point residual paraffinic wax as the wax emulsion component but using a more highly crystalline copolymer in the polymeric emulsion. The use of the more highly crystalline copolymer necessitated some revisions in the method of preparing the polymer emulsion or latex.

The latex was prepared as follows:

A solution of 4.6% wt. copolymer in benzene was heated with stirring to 65° C. and 1% wt. oleic acid and 1.3% wt. potassium salt of rosin acids were added to the hot cement and the cement containing the emulsion stabilizers was homogenized in an Eppenbach Homomixer. The weight phase ratio is 1 of the dispersed phase to 2 of the aqueous continuous phase. The resultant dilute emulsion was stripped of benzene in a stream of nitrogen and allowed to settle overnight, during which time it creamed, forming a stable upper emulsion layer containing 29.4% wt. solids. This concentrated emulsion was then used in film-forming tests. The results of these tests were as follows:

TABLE III.—MECHANICAL PROPERTIES OF FILMS CAST FROM BLENDS OF LATEX CONTAINING COPOLYMER OF HIGH ETHYLENE CONTENT AND AN EMULSION OF HMP RESIDUAL PARAFFINIC WAX

Latex:
  Solids: 29.4% wt.
  Copolymer: Ethylene-propylene copolymer, 2.2 I.V., 90 mole percent $C_2^=$
  Emulsifier: Oleic acid and potassium salt of rosin acids
Emulsion:
  Wax: 183° F. M.P. paraffinic residual wax
  Emulsifier: Morpholine-stearic acid

| Test No. | Percent wt. Solids in Mixture | Percent wt. Copolymer in Solids | Mechanical Properties of Heat-Treated Film [1] | | | |
|---|---|---|---|---|---|---|
| | | | At Yield Point | | At Break Point | |
| | | | Tensile (p.s.i.) | Elongation (percent) | Tensile (p.s.i.) | Elongation (percent) |
| 15 | 26.9 | 21.8 | 636 | <20 | 584 | 700 |
| 16 | 27.0 | 27.4 | 512 | ca. 20 | 1,100 | ca. 900 |
| 17 | 27.1 | 35.8 | 564 | ca. 20 | 770 | 900 |

[1] 15 minutes at 90° C.

Each of the foregoing films before heat treatment was extremely brittle at room temperature. However, heat treatment resulted in large increases in elongation and tensile strength. The tensile strengths observed approach the tensile properties of the polymer by itself, while the elongation at break is significantly higher than for the neat copolymer. For this reason, the higher ethylene-containing (more crystalline) copolymers are preferred for the method of this invention.

Analysis of the results of the foregoing examples dictates that the amount of copolymer in the mixed emulsions should not exceed about 40% by weight and preferably no more than about 30% by weight should be employed. On the other hand, in order to obtain significant wax-polymer interaction and improved cast film mechanical properties, the mixed emulsions should contain at least 5% by weight copolymer. A range of 10–30% by weight copolymer is particularly preferred since optimum physical properties are imparted to the resultant films in this range.

The effective film strength and other film properties which are achieved by coating substrates by the method of the invention are illustrated by the following examples.

EXAMPLE IV

Strips of milk carton board were dipped in a blend of wax emulsion and copolymer emulsion and dried at 50° C. The strips, which had an average of 3 mg./cm.$^2$ of solids deposited thereon were then sealed to each other by the application of heat (temperature above the melting point of the wax) and pressure on a Sentinal sealer. When the coated and sealed strips were torn apart, complete fiber tear occurred. Thus the film was stronger than the paper itself.

The properties of the emulsions and the emulsions blend were as follows:

PROPERTIES OF BLENDED EMULSIONS

*Emulsion*

Solids: 20.7% wt.
Wax: 141–143° M.P. paraffin distillate wax.
Emulsifier: Morpholine-stearic acid.

*Latex*

Solids: 65.3% wt.
Copolymer: Ethylene-propylene copolymer, 4.4 I.V., 65 mole percent $C_2^=$.
Emulsifier: Oleic acid and potassium salt of rosin acids.

*Blend*

Total Solids: 25.2% wt.
Copolymer: 26.0% wt.

EXAMPLE V

Strips of milk carton board were dipped in a blend of wax and polymer emulsions as in Example IV. Some of the samples were dried at 50° C., others at 80° C. The resultant films had a moderately glossy appearance. Upon passing the film between the bright chrome rolls of a rubber mill at 40° C. with a linear speed of 45 feet per minute and a clearance such as to exert a moderate compression of the film, both of the films were greatly improved in gloss. The films which had been dried at 80° C., which is above the melting point of the wax, did, however, have a slightly higher gloss than those which had been dried at only 50° C.

EXAMPLE VI

A small amount of the emulsion blend of Example IV was spread onto milk carton board by means of a roller so as to obtain a very thin coating, which was estimated to be under 0.3 mg./cm.$^2$. The dry deposited film was invisible to the naked eye, but the stable contact angle of water placed on the film was nevertheless 99.4°. Though this indicates good water repellency even without heating, the following example shows that water repellency is also improved by the step of heating the film to above the melting point of the wax component.

EXAMPLE VII

Using the same emulsion blend and carton stock as in Example IV, several strips were dipped in the blended emulsions to deposit a coating of 3.0–3.3 mg./cm.$^2$. Half of the samples were dried at 50° C. only, while the rest were dried at 50° C. and heated to 80° C. Six water contact angle measurements were then made on each set of samples. The set which had been dried at 50° C. only exhibited an average stable water contact angle of 99.5°, while the heat-treated set exhibited an average stable water contact angle of 105.6°. It is therefore apparent that the heat-treating step is also beneficial in improving the water repellency of the films made from mixed wax and polymer emulsions.

As will be recognized by anyone skilled in the art, the latex, the wax "emulsion" and the mixed "emulsions" are not, strictly speaking, emulsions, but stable dispersions of finely divided solid particles in water. However, because of the common industry usage of the term "emulsion" as applied to stable dispersions of wax in water, usage of the term "emulsion" is retained here.

We claim as our invention:

1. A method for applying improved wax-polymer films to substrates comprising the sequential steps (1) mixing an aqueous wax emulsion with an aqueous emulsion of a copolymer of ethylene and a higher olefin having (a) from 3 to 8 carbon atoms per molecule, (b) an intrinsic viscosity of from 1 to 6 and (c) containing at least 60 mole percent of ethylene monomer, thereby forming an emulsions mixture the solids portion of which contains from 5 to 40 percent by weight copolymer, (2) applying the emulsions mixture to a substrate; (3) removing essentially all the water from the emulsion mixture to form a wax-polymer film; (4) heating the thus-formed film to a temperature above the melting point of the wax but below the temperature at which thermal decomposition takes place to obtain particle coalescence; and (5) cooling the film.

2. The method of claim 1 in which the solids portion of the emulsions mixture contains from 10 to 30 percent by weight copolymer.

3. The method of claim 1 in which the copolymer contains from 80 to 95 mole percent of ethylene monomer.

4. The method of claim 1 in which the higher olefinic monomer of the copolymer is propylene and the intrinsic viscosity of the copolymer is from 2 to 5.

References Cited
UNITED STATES PATENTS

| | | |
|---|---|---|
| 2,030,385 | 2/1936 | Manson. |
| 2,043,897 | 6/1936 | Levey _____ 117—158 X |
| 2,099,726 | 11/1937 | Dodge _____ 117—158 X |
| 2,898,293 | 8/1959 | Capell et al. _____ 117—158 |
| 2,926,062 | 2/1960 | Gagliardi _____ 117—158 X |
| 3,065,099 | 11/1962 | Newman _____ 117—158 X |
| 3,210,305 | 10/1965 | Coenen et al. _____ 260—28.5 |
| 3,227,669 | 1/1966 | Sauer _____ 260—28.5 |
| 3,267,060 | 8/1966 | Putnam et al. _____ 117—155 |
| 3,312,564 | 4/1967 | Barbour _____ 117—158 X |

WILLIAM D. MARTIN, *Primary Examiner.*

M. LUSIGNAN, *Assistant Examiner.*